United States Patent
Kumamoto et al.

(10) Patent No.: US 8,029,896 B2
(45) Date of Patent: Oct. 4, 2011

(54) GAS BARRIER MATERIAL

(75) Inventors: Yoshiaki Kumamoto, Tochigi (JP); Kenta Mukai, Tochigi (JP); Toru Ugajin, Tochigi (JP); Takahiro Maezawa, Tochigi (JP); Naoki Honbo, Maibara (JP); Akira Isogai, Tokyo (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 12/672,320

(22) PCT Filed: Aug. 7, 2008

(86) PCT No.: PCT/JP2008/064558
§ 371 (c)(1),
(2), (4) Date: Aug. 6, 2010

(87) PCT Pub. No.: WO2009/020239
PCT Pub. Date: Feb. 12, 2009

(65) Prior Publication Data
US 2010/0316863 A1 Dec. 16, 2010

(30) Foreign Application Priority Data

Aug. 7, 2007 (JP) ................................ 2007-205087
Aug. 7, 2007 (JP) ................................ 2007-205088

(51) Int. Cl.
*B32B 23/00* (2006.01)
(52) U.S. Cl. .......................................... 428/393; 536/56
(58) Field of Classification Search .................. 428/393; 162/100; 536/56
See application file for complete search history.

(56) References Cited

U.S. PATENT DOCUMENTS

| | | | | |
|---|---|---|---|---|
| 5,414,079 A | * | 5/1995 | Banker et al. | 536/56 |
| 5,780,618 A | * | 7/1998 | Banker et al. | 536/56 |
| 6,615,539 B1 | * | 9/2003 | Obonai et al. | 47/62 N |
| 6,716,976 B1 | * | 4/2004 | Jetten et al. | 536/124 |
| 2010/0233481 A1 | * | 9/2010 | Isogai et al. | 428/401 |
| 2010/0316863 A1 | * | 12/2010 | Kumamoto et al. | 428/292.1 |
| 2011/0008638 A1 | * | 1/2011 | Miyawaki et al. | 428/537.5 |

FOREIGN PATENT DOCUMENTS

| | | | | |
|---|---|---|---|---|
| JP | 10-140493 A | * | 5/1998 | |
| JP | 11-320802 A | * | 11/1999 | |
| JP | 2001-334600 A | * | 12/2001 | |
| JP | 2002-348522 A | * | 12/2002 | |
| JP | 2008-1728 A | * | 1/2008 | |

OTHER PUBLICATIONS

JP 2008001728 Machine Translation Jan. 10, 2008.*
T. Saito et al., "Homogeneous Suspensions of Individualized Microfibrils from TEMPO-Catalyzed Oxidation of Native Cellulose," Biomacromolecules, vol. 7, No. 6, pp. 1687-1691, 2006.
Y. Kato et al., "Oxygen Permeability and Biodegradability of Polyuronic Acids Prepared from Polysaccharides by TEMPO-Mediated Oxidation," Journal of Polymers and the Environment, vol. 13, No. 3, pp. 261-266, Jul. 2005.

* cited by examiner

*Primary Examiner* — N. Edwards
(74) *Attorney, Agent, or Firm* — Birch, Stewart, Kolasch & Birch, LLP

(57) ABSTRACT

Provided is a material for gas barrier containing cellulose fibers having an average fiber diameter of not more than 200 nm, wherein the content of the carboxyl group in a cellulose composing the cellulose fiber is 0.1 to 2 mmol/g. A molded composite having gas barrier properties such as high oxygen barrier properties can be produced by applying the material for gas barrier on a substrate and drying.

9 Claims, 3 Drawing Sheets

GAS BARRIER MATERIAL

FIELD OF THE INVENTION

The present invention relates to materials for gas barrier capable of forming a layer, molded articles having a layer in which the layer can control permeation of various gases such as oxygen, water vapor, carbon dioxide or nitrogen, molded articles having gas barrier properties produced from the material, and molded composites having gas barrier properties using the materials.

BACKGROUND OF THE INVENTION

Current materials for gas barrier, such as for shielding oxygen and vapor, are produced mainly from fossil resources, are non-biodegradable, and have to be incinerated after use. Materials for oxygen barrier that are biodegradable and produced from reproducible biomass thus has been studied.

SUMMARY OF THE INVENTION

The present invention provides a material, or materials, for gas barrier, containing cellulose fiber having an average fiber diameter of not more than 200 nm, wherein the content of the carboxyl group in the cellulose composing the cellulose fiber ranges from 0.1 to 2 mmol/g.

The present invention provides a molded article, or molded articles, having gas barrier properties composed of the material for gas barrier.

The present invention provides a molded composite, or molded composites, having gas barrier properties, containing a molded substrate and a layer composed of the material for gas barrier.

The present invention also provides use of a material, or materials, containing cellulose fibers having an average fiber diameter of not more than 200 nm, wherein the content of the carboxyl group in a cellulose composing the cellulose fiber ranges from 0.1 to 2 mmol/g for gas barrier or use of the material for producing a gas barrier.

The present invention also provides a method, or methods, for shielding a gas with a material containing cellulose fibers having an average fiber diameter of not more than 200 nm, wherein the content of the carboxyl group in the cellulose composing the cellulose fiber ranges from 0.1 to 2 mmol/g.

DETAILED DESCRIPTION OF THE INVENTION

JP-A 2001-334600 relates to materials for gas barrier produced from water-soluble polysaccharides including polyuronic acid. In a high humidity atmosphere, the gas barrier properties of the materials may become worse.

JP-A 2002-348522 relates to a coating agent containing microcrystalline cellulose and a layered material produced by applying the coating agent on a substrate. The patent describes that microcrystalline cellulose powder as a raw material preferably has an average particle diameter of not more than 100 μm, and that cellulose powders having only average particle diameters of 3 μm and 100 μm were used in Examples. There is no description about a pulverizing treatment of fiber described below. The patent has room for improvement in compactness, film strength, and adhesion to the substrate of the coating agent layer applied.

JP-A 2008-1728 relates to fine cellulose fibers. The patent describes an ability of the fiber to be used as coating materials, but no application with specific effects.

Biomacromolecules Volume 7, Number 6, 2006, June, published by the American Chemical Society, does not at all describe gas barrier properties such as oxygen barrier.

The present invention provides a material for gas barrier which is biodegradable, and has a compact layer which has and retains high gas barrier properties to various gases in a high humidity atmosphere.

The present invention also provides a molded article having gas barrier properties, having the material alone for gas barrier without any substrate.

The present invention also provides a molded composite having gas barrier properties, which integrates the material for gas barrier and a substrate with good adhesion to the substrate and has high gas barrier properties to various gases.

The present invention provides the following aspects and embodiments:

(1) a material for gas barrier containing cellulose fibers having an average fiber diameter of not more than 200 nm, wherein the content of the carboxyl group in a cellulose composing the cellulose fiber ranges from 0.1 to 2 mmol/g;

(2) the material for gas barrier according to (1), wherein the cellulose fibers have an average aspect ratio from 10 to 1,000;

(3) the material for gas barrier according to (1) or (2), wherein a suspension of the cellulose fibers diluted to 0.1% by mass of solid content of dispersion contains cellulose fibers passing through a 16 μm-mesh glass filter in an amount of not less than 5% by mass of the whole cellulose fibers in the suspension before passing;

(4) the material for gas barrier according to (1) or (2), wherein a suspension of the cellulose fibers diluted to 1% by mass of solid content does not contain a cellulose particle having a particle diameter of not less than 1 μm;

(5) the material for gas barrier according to (1) or (2), wherein a suspension of the cellulose fibers diluted to 1% by mass of solid content has a light transmittance of not less than 0.5%;

(6) a molded article having gas barrier properties and composed of the material for gas barrier according to any of (1) to (5);

(7) a molded composite having gas barrier properties and containing a molded substrate and a layer composed of the material for gas barrier according to any of (1) to (5);

(8) the molded composite having gas barrier properties according to (7), wherein the substrate or a moisture preventive layer has a vapor permeability from 0.1 to 600 g/m²·day;

(9) the molded composite having gas barrier properties according to (7) or (8), wherein the substrate or the moisture preventive layer is composed of a biodegradable material or a biomass-derived material;

(10) the molded composite having gas barrier properties according to any of (7) to (9), wherein the layer composed of the material for gas barrier has a thickness of not more than 900 nm; and

(11) the molded composite having gas barrier properties according to any of (7) to (10), wherein the layer composed of the material for gas barrier is formed by coating or spraying the material for gas barrier.

The "material for gas barrier" in (1) is molded by itself or integrated to another substrate to enable exhibiting gas barrier properties of controlling gas permeation. The material for gas barrier can be in the state of suspension (including both clear and cloudy liquids), powder, or the like.

Examples of the gas to be shielded include oxygen, water vapor (vapor), carbon dioxide, carbon monoxide, nitrogen, nitrogen oxides, hydrogen, and argon.

The "molded article having gas barrier properties" in (6) does not contain the substrate described in (7), and refers to a thin article of a desired shape and a desired size such as a film and a sheet.

The "molded composite having gas barrier properties" in (7) is a molded article containing two or more materials and having properties of controlling gas permeation. The "molded substrate" refers to a thin article of a desired shape and a desired size such as a film or a sheet, or a container of a desired shape and a desired size such as a box or a bottle.

In the present invention, the "gas barrier properties" are evaluated by the following methods:

Oxygen barrier properties: oxygen permeability measured by the method (differential pressure method) in accordance with ASTM D-1434-75M, or by the method (equal pressure method) in accordance with JIS K7126-2, Appendix A;

Vapor barrier properties: vapor permeability measured by the method in accordance with JIS Z0208.

In the molded article having gas barrier properties and the molded composite having gas barrier properties produced from the material for gas barrier of the present invention, a layer composed of the material for gas barrier has a compact structure and high gas barrier properties. In addition, in the molded composite having gas barrier properties, the layer composed of the material for gas barrier adheres well to the substrate. The molded composite containing a substrate or a moisture preventive layer having a vapor permeability from 0.1 to 600 g/m$^2$·day can achieve high gas barrier properties in a high humidity atmosphere. The present invention provides the material for gas barrier that can produce a molded article having high gas barrier properties against oxygen or the like.

<Material for Gas Barrier>

The cellulose fibers used in the present invention has an average fiber diameter of not more than 200 nm, preferably from 1 to 200 nm, more preferably from 1 to 100 nm, and even more preferably from 1 to 50 nm. The average fiber diameter can be measured by the method described in Examples.

From the viewpoint of achieving high gas barrier properties, the content of the carboxyl group in the cellulose composing the cellulose fiber used in the present invention is from 0.1 to 2 mmol/g, preferably from 0.4 to 2 mmol/g, more preferably from 0.6 to 1.8 mmol/g, and even more preferably from 0.6 to 1.6 mmol/g. The content of the carboxyl group can be measured by the method described in Examples. A cellulose containing a carboxyl group in an amount of less than 0.1 mmol/g cannot produce cellulose fibers having an average fiber diameter of not more than 200 nm by the pulverizing treatment of fibers described below.

In the cellulose fibers used in the present invention, the content of the carboxyl group in the cellulose composing the cellulose fiber is within the range described above. In some treatment situations such as oxidizing treatment in a practical production process, however, the content of the carboxyl group may be larger than the above specified range after the oxidizing treatment, the product containing extra carboxyl group being an impurity.

The cellulose fibers used in the present invention have an average aspect ratio from 10 to 1,000, more preferably from 10 to 500, and even more preferably from 100 to 350. An average aspect ratio can be measured by the method described in Examples.

The material for gas barrier of the present invention is used to form a barrier layer for suppressing gas permeation. For example, the material can be used as a starting material for producing a molded article such as a monolayer film or sheet composed of only the material, and also as a starting material for producing a molded composite article having an appropriate substrate and one or more layers composed of the material formed on the substrate.

For example, the material for gas barrier of the present invention can be produced by the following method. First, to natural fibers as a raw material is added water of about 10 to 1000 times by dry mass, and the mixture is processed with a mixer or the like to provide a slurry.

Examples of the natural fibers as a raw material include wood pulps, nonwood pulps, cotton, and bacterial celluloses.

Next, the natural fibers are subjected to an oxidizing treatment with 2,2,6,6-tetramethyl-1-piperidine-N-oxyl (TEMPO) as a catalyst. Other catalysts can also be used, including derivatives of TEMPO such as 4-acetamide-TEMPO, 4-carboxy-TEMPO, and 4-phosphonoxy-TEMPO.

The amount of TEMPO used is within the range from 0.1 to 10% by mass relative to the natural fibers used as the raw material (based on dry mass).

In the oxidizing treatment, a cooxidant is used together with TEMPO, including oxidants such as sodium hypochlorite and bromides such as sodium bromide.

Examples of the oxidant that can be used include hypohalous acids and salts thereof, halous acids and salts thereof, perhalic acids and salts thereof, hydrogen peroxide, and organic peracids. Preferred are alkaline metal hypohalites such as sodium hypochlorite and sodium hypobromite. The amount of the oxidant used is within the range from about 1 to 100% by mass relative to the natural fibers used as the raw material (based on dry mass).

For the cooxidant, alkaline metal bromides such as sodium bromide are preferably used. The amount of the cooxidant used is within the range from about 1 to 30% by mass relative to the natural fibers used as the raw material (based on dry mass).

The pH of the slurry is preferably kept within the range from 9 to 12 for effectively progressing oxidation.

The temperature of the oxidizing treatment (temperature of the slurry) is arbitrarily set in the range from 1 to 50° C. The oxidizing treatment can progress at room temperature and does not require specific temperature control. The time of the oxidizing treatment is desirably 1 to 240 minutes.

After the oxidizing treatment, the catalyst and the like are removed by washing with water or the like. In this stage, the treated fibers are not pulverized, and can be purified by repetitive washing and filtering. An intermediate of the material for gas barrier (material for gas barrier before the pulverizing treatment described below) can be prepared in the form of fiber or powder, which is dried according to need.

Then, the intermediate material is dispersed in a solvent such as water, and pulverized to a desired fiber width and length with a defibrator, a beater, a low-pressure homogenizer, a high-pressure homogenizer, a grinder, a cutter mill, a ball mill, a jet mill, a single screw extruder, a twin screw extruder, an ultrasonic agitator, or a home juicer-mixer. In this step, the solid content of the dispersion is preferably not more than 50% by mass. The dispersion having a solid content higher than 50% by mass requires high energy for dispersing, which is unfavorable.

Such a pulverizing treatment produces cellulose fibers having an average fiber diameter of not more than 200 nm, and preferably having an average aspect ratio from 10 to 1,000, more preferably from 10 to 500, and even more preferably from 100 to 350.

Then, the material for gas barrier can be obtained in the form of a suspension (visually colorless and transparent or opaque liquid) having an adjusted solid content or in the form of a dried powder (powdery aggregates of cellulose fibers, not cellulose particles). When a suspension is produced, it may be produced using only water or a mixed solvent of water with other organic solvent (e.g., an alcohol such as ethanol), a surfactant, an acid, and a base.

These oxidizing and pulverizing treatments convert hydroxy groups at C6-position of cellulose-constituting units to carboxyl groups via aldehyde groups by selective oxidation and produce pulverized fibers of high crystalline cellulose having an average fiber diameter of not more than 200 nm composed of the cellulose containing a carboxyl group in an amount from 0.1 to 2 mmol/g. The fibers of high crystalline cellulose have Type I crystal structure of cellulose. This means that the cellulose fibers are produced by surface oxidation and pulverization of a naturally-occurred solid cellulose having Type I crystal structure. In other words, natural cellulose fibers have a higher ordered solid structure through formation of bundles of fine fibers, called microfibrils, produced in a biosynthesis process of the natural cellulose fibers. In the present invention, strong cohesion force (hydrogen bonding between surfaces) among microfibrils is reduced by introducing aldehyde or carboxyl groups and then fine cellulose fibers are obtained by pulverization.

The content of the carboxyl group can be increased or decreased within a given range by adjusting oxidizing treatment conditions, thereby changing polarity of the cellulose fiber. An average fiber diameter, an average fiber length, an average aspect ratio, and the like of the cellulose fibers can be controlled by thus controlling electrostatic repulsion of the carboxyl group and pulverizing conditions.

The cellulose fibers produced by the oxidizing and pulverizing treatments may satisfy the following requirements (I), (II), and (III):

(I): a material for gas barrier having good properties is produced, wherein a suspension of the cellulose fibers diluted to 0.1% by mass of a solid content contains cellulose fibers passing through a 16 μm-mesh glass filter in an amount of not less than 5% by mass of the whole cellulose fibers in the suspension before passing;

(II): the suspension of cellulose fibers diluted to 1% by mass of solid content does not contain cellulose particles having particle diameters of not less than 1 μm; and (III): the suspension of cellulose fibers diluted to 1% by mass of solid content has a light transmittance of not less than 0.5%.

Requirement (I): The suspension of cellulose fibers diluted to 0.1% by mass of a solid content produced by the oxidizing and pulverizing treatments contains cellulose fibers passing through a 16 μm-mesh glass filter in an amount of not less than 5% by mass of the whole cellulose fibers in the suspension before passing (a percentage by mass of fine cellulose fibers passing through the glass filter is referred to as the content of fine cellulose fibers). From the viewpoint of gas barrier properties, the content of fine cellulose fibers is preferably not less than 30%, and more preferably not less than 90%.

Requirement (II): The suspension of cellulose fibers diluted to 1% by mass of a solid content produced by the oxidizing and pulverizing treatments preferably contains pulverized natural fibers of the starting material, but does not contain cellulose particles having particle diameters of not less than 1 μm. As used herein, the "particle or particles" refers to that having a nearly spherical shape and a projection geometry (projected geometry) of the shape on a plane in which a rectangle encompassing the geometry has a ratio of a long axis to a short axis (long axis/short axis) of up to 3. The particle diameter of the granule is defined by an arithmetic average of the long axis and the short axis. The presence or absence of the particle is determined by observation with an optical microscope described below.

Requirement (III): The suspension of cellulose fibers at 1% by mass of solid content produced by the oxidizing and pulverizing treatments preferably has a light transmittance of not less than 0.5%, and from the viewpoint of gas barrier properties, more preferably not less than 40%, and even more preferably not less than 60%.

In a gas barrier layer composed of the material for gas barrier produced by the oxidizing and pulverizing treatments, fine cellulose fibers will strongly interact with each other to form hydrogen bonds and crosslink, thereby preventing gas dissolution and diffusion. The material will thus exhibit gas barrier properties such as high oxygen barrier properties. In addition, since a size and a distribution of pores among cellulose fibers of a molded article can be varied (in other words, effects of molecular sieving can be varied) according to a width and a length of cellulose fibers, the gas barrier can be expected to have molecular selective barrier properties.

In preparing a suspension of the material for gas barrier of the present invention, the sold content of the suspension can be adjusted to be suitable for molding as desired. For example, the solid content may be in the range from 0.05 to 30% by mass.

<Molded Article Having Gas Barrier Properties>

The molded article having gas barrier properties of the present invention is produced by molding a suspension of the material for gas barrier.

The molded article having gas barrier properties of the present invention can be produced by the following method, for example. In the method, as the material for gas barrier, used is a suspension of pulverized oxidized cellulose fibers. In the method, the viscosity of the suspension varies from 10 to 5000 mPa·s.

On a substrate such as a glass plate, the material for gas barrier is cast and applied (coated), and dried by air drying or wind-blowing to form film. The film is removed from the substrate to provide the molded article having gas barrier properties (gas barrier film) of the present invention ("method of casting" described in Examples).

The molded article having gas barrier properties of the present invention can be obtained to have intended properties according to design (high barrier properties, transparency, etc.) by controlling the content of the carboxyl group and an aspect ratio of cellulose fibers in the material for gas barrier and a thickness of the molded article having gas barrier properties.

<Molded Composite Having Gas Barrier Properties>

The molded composite having gas barrier properties of the present invention contains a molded substrate and a layer composed of the material for gas barrier.

The material for gas barrier is applied on a side or both sides of the substrate by known methods such as applying, spraying, and dipping, and preferably by coating or spraying, to form a gas barrier layer (layer capable of suppressing gas permeation). The formed layer is dried by air-drying, wind-blowing, or the like.

It can be applied to a layer and adhere to a pre-molded article having gas barrier properties composed of the material for gas barrier on the substrate. Known adhering methods, such as adhering with an adhesive and heat fusion, can be used.

The thickness of the layer composed of the material for gas barrier (gas barrier layer) is preferably from 20 to 900 nm, more preferably from 50 to 700 nm, and even more preferably from 100 to 500 nm.

For the molded substrate, the following can be used, including a thin article having a desired shape and a desired size, such as film, sheet, woven fabric or nonwoven fabric, and three-dimensional containers of various shapes and sizes such as boxes and bottles. These molded substrates can be made of paper, paperboard, plastic, metal (those having many pores or in the form of woven metal mainly used for reinforcement), or composite material thereof. Among these materials, preferably used are plant-derived materials such as paper and paperboard, biodegradable materials such as biodegradable plastics, and biomass-derived materials. The molded substrate may have a multi-layer structure composed of a combination of a single material or different materials (e.g. adhesives and wettability-increasing agents).

The material of the plastic substrate can be appropriately selected according to intended use. Examples of the material include polyolefins such as polyethylene and polypropylene, polyamides such as nylons 6, 66, 6/10, and 6/12, polyesters such as poly(ethylene terephthalate) (PET), poly(butylene terephthalate), aliphatic polyesters, polylactic acid (PLA), polycaprolactone, and polybutylene succinate, cellophanes such as cellulose, and triacetic acid cellulose (TAC). These plastics may be used alone or in combination.

The thickness of the molded substrate is not specifically limited, and appropriately selected to give a strength suitable for intended use. For example, the thickness is within the range from 1 to 1000 μm.

The layer composed of the material for gas barrier of the molded composite having gas barrier properties of the present invention reduces its gas barrier properties under high humidity conditions, because vapor dissolves and disperses in the gas barrier layer to disarray a compact structure.

The molded composite having gas barrier properties of the present invention thus may contain a substrate having high moisture-proof properties or be further covered with a moisture preventive layer to form a layered molded composite having gas barrier properties.

For layering the moisture preventive layer, known methods can be used, including adhering with an adhesive, pasting by heat fusion, applying, spraying, and dipping. In this case, for the substrate and the moisture preventive layer having high moisture-proof properties, the following can be used, including plastics such as polyolefin and polyester, plastics on which an inorganic oxide (e.g., aluminum oxide and silicon oxide) is deposited, laminates of plastics with paperboard, wax, and wax-coated paper. For the substrate and the moisture preventive layer having high moisture-proof properties, preferably used are those having a vapor permeability of 0.1 to 600 g/m²·day, more preferably 0.1 to 300 g/m²·day, and even more preferably 0.1 to 100 g/m²·day. Use of the substrate and the moisture preventive layer having high moisture-proof properties enables prevention of vapor dissolution and dispersion in the gas barrier layer, thereby preventing reduction of gas barrier properties under high humidity conditions.

The molded composite having gas barrier properties of the present invention can have intended properties according to design (high barrier properties, transparency, etc.) by controlling the content of the carboxyl group and an aspect ratio of cellulose fibers in the material for gas barrier, a thickness of the layer composed of the material for gas barrier, and vapor permeabilities of the substrate and the moisture preventive layer.

EXAMPLES

Figure 1:
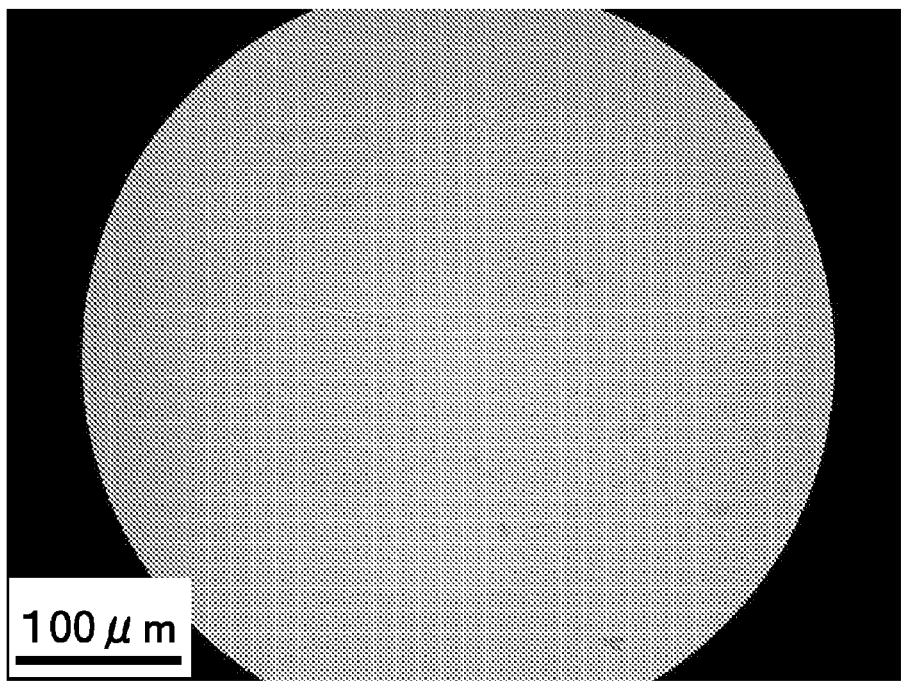
FIG. 1 shows an optical microscopic image of the suspension in Example 5.

The following Examples demonstrate the present invention. Examples are intended to illustrate the present invention and not to limit the present invention.

Properties shown in Table 1 were measured as described below.

(1) Properties of a Suspension (1-1) Light Transmittance

Using a spectrophotometer (UV-2550, Shimadzu Corporation), a suspension of 1% by mass concentration was measured for light transmittance (%) at a wavelength of 660 nm with an optical path length of 1 cm. For some Examples and Comparative Examples, the suspension of a concentration other than 1% by mass was measured.

(1-2) Viscosity

Using a type E viscometer (Visconic, Tokimec), a suspension of 1% by mass concentration was measured for viscosity at 23° C. with 5 rpm. For some Examples and Comparative Examples, the suspension of a concentration other than 1% by mass was measured.

(2) Cellulose Fibers (2-1) Average Fiber Diameter, Average Fiber Length, and Average Aspect Ratio For an average fiber diameter of cellulose fibers, the suspension diluted to a concentration of 0.0001% by mass was dropped on mica and dried to give an observation sample. The observation sample was measured for fiber height with an atomic force microscope (Nanoscope III Tapping mode AFM, Digital instrument, with a probe Point Probe (NCH) available from Nanosensors). In an image showing recognizable cellulose fibers, five or more fibers were selected and used to determine the average fiber diameter from heights thereof.

An average aspect ratio was calculated from a viscosity of a diluted suspension (0.005 to 0.04% by mass) of cellulose fibers in water. The viscosity was measured at 20° C. with a rheometer (MCR300, DG42 (double cylinder), PHYSICA). Using the relationship between a mass concentration of cellulose fibers and a specific viscosity of a cellulose fiber suspension to water, an aspect ratio of cellulose fibers was back-calculated with the following formula and considered as an average aspect ratio of cellulose fibers.

$$\eta_{sp} = \frac{2\pi P^2}{45(\ln P - \gamma)} \times \frac{\rho_s}{\rho_0} \times C$$

Formula (8.138) for viscosity of solid stick molecule described in The Theory of Polymer Dynamics, M. DOI and D. F. EDWARDS, CLARENDON PRESS, OXFORD, 1986, P312 was used (in the present invention, solid stick molecule=cellulose fiber). The formula 1 is derived from Formula (8.138) and the relationship of $Lb^2 \times \rho_0 = M/N_A$. In the formulae, $\eta_{sp}$ represents a specific viscosity, $\pi$ represents the circle ratio, ln represents the logarithm natural, P represents an aspect ratio (L/b), γ=0.8, $\rho_s$ represents the density of a dispersion medium (kg/m³), $\rho_0$ represents the density of cellulose crystal (kg/m³), C represents the mass concentration of cellulose (C=ρ/$\rho_s$), L represents the fiber length, b represents the fiber width (assuming that the cross section of the cellulose fiber is a square), ρ represents the concentration of cellulose fibers (kg/m³), M represents the molecular weight, and $N_A$ represents Avogadro's number.

In Comparative Examples 5 and 7, the methods of measurement as stated above were difficult to be used. In these Examples, images were taken with an atomic force microscope or an optical microscope (ECLIPSE E600 POL, Nikon Corporation) and used to determine the fiber diameter, the fiber length, and the aspect ratio (fiber length/fiber diameter) by picking up five or more cellulose solid matters in the images. In Comparative Example 5, an atomic force microscopic image was taken and used to measure the fiber length. The aspect ratio was calculated from the ratio of the fiber length to the fiber diameter. In Comparative Example 7, cellulose contained particles. Using an optical microscopic image, the ratio of the long axis to the short axis (long axis/short axis) of a rectangle enclosing a cellulose solid matter was used to calculate the aspect ratio. In Table 3, the short axis is shown as the fiber diameter, and the long axis the fiber length.

The average fiber length was calculated from the fiber diameter and the aspect ratio measured by these methods.

(2-2) Content of Carboxyl Group (mmol/g)

In a 100 ml beaker, about 0.5 g by dry weight of oxidized pulp was mixed with ion-exchanged water to have a total volume of 55 ml. To this was added 5 ml of 0.01 M aqueous solution of sodium chloride and stirred with a stirrer for sufficient dispersing to prepare a pulp suspension. To the suspension was added 0.1M hydrochloric acid to adjust the pH to 2.5 to 3.0, and subjected to titration by injecting 0.05 M aqueous solution of sodium hydroxide at a waiting time of 60 seconds with an automated titrator (AUT-501, DKK-Toa Corporation). The conductivity and the pH of the pulp suspension were repeatedly measured every one minute until the pH of the suspension reached around 11. The resultant conductivity curve was used to determine a sodium hydroxide titer and calculate the content of the carboxyl group.

A natural cellulose fiber exists as a bundle of high crystalline microfibrils formed by aggregation of about 20 to 1500 cellulose molecules. Use of TEMPO oxidization in the present invention enables selective introduction of the carboxyl group to the surface of the crystalline microfibril. In the present invention, the carboxyl group is thus introduced only to the surface of cellulose crystal, but the content of the carboxyl group defined by the method of measurement above represents an average value per weight of cellulose.

(2-3) Mass Percentage of Fine Cellulose Fibers in Cellulose Fiber Suspension (a Content of Fine Cellulose Fibers) (%)

0.1% by mass suspension of cellulose fibers was prepared and measured for solid content. The suspension was suction-filtered through a 16 μm-mesh glass filter (25G P16, SHIBATA Scientific Technology Ltd.). The filtrate was measured for solid content. The solid content of the filtrate (C1) was divided by the solid content of the suspension before filtration (C2). A value (C1/C2) was considered as the content of fine cellulose fibers (%).

(2-4) Observation of Suspension

A suspension diluted to 1% by mass of solid content was prepared. A drop thereof was placed on a slide glass and covered with a cover glass to provide an observation sample. Arbitrarily selected five spots in the observation sample were observed with an optical microscope (ECLIPSE E600 POL, Nikon Corporation) at 400-fold magnification for the presence or absence of a cellulose particle having a particle diameter of not less than 1 μm. The "particle" refers to that having a nearly spherical shape and a projection geometry of the shape on a plane in which a rectangle enclosing the geometry has a ratio of a long axis to a short axis (long axis/short axis) of up to 3. The diameter of the particle is defined by an arithmetic average of the long and short axes. Observation under crossed nicols may be employed for clearer observation.

(3) Gas Barrier Film (3-1) Oxygen Permeability (Differential Pressure Method) (cm³/m²·day·Pa)

The sample was evacuated for 24 hours and measured at 23° C. with a gas permeability tester (model M-C3, Toyo Seiki Seisaku-sho, LTD.) in accordance with ASTM D-1434-75M.

(3-2) Oxygen Permeability (Equal Pressure Method) (cm³/m²·day·Pa)

The oxygen permeability was measured under conditions of 23° C. and 0% RH with an oxygen permeability tester OX-TRAN2/21 (model ML&SL, Modern Control) in accordance with the method of JIS K7126-2, Appendix A, and more specifically, in an atmosphere of oxygen gas of 23° C. and 0% RH and nitrogen gas (carrier gas) of 23° C. and a humidity of 0%. For some molded composites, the oxygen permeability was measured under conditions of 23° C. and 90% RH.

(3-3) Vapor Permeability (g/m²·day)

The vapor permeability was measured by a cup method under conditions of 40° C. and 90% RH in accordance with JIS Z0208.

Example 1

[Preparation of Material for Gas Barrier]
(1) Starting Material, Catalyst, Oxidant, and Cooxidant
  natural fiber: bleached softwood kraft pulp (Fletcher Challenge Canada Ltd., trade name: Machenzie, CSF 650 ml)
  TEMPO: commercial product (ALDRICH, Free radical, 98%)
  sodium hypochlorite: commercial product (Wako Pure Chemical Industries, Ltd., Cl: 5%)
  sodium bromide: commercial product (Wako Pure Chemical Industries, Ltd.)
(2) Procedure of Preparation 3 g of the bleached softwood kraft pulp was sufficiently stirred in 297 g of ion-exchanged water. 1.25% by mass of TEMPO, 12.5% by mass of sodium bromide, and 14.2% by mass of sodium hypochlorite were added in this order, the percents being in relation to 3 g by mass of the pulp. The pulp was oxidized for 60 minutes at 20° C. while keeping the pH at 10.5 by dropping 0.5M sodium hydroxide using a pH-stat.

Then, dropping was stopped to provide an oxidized pulp. The oxidized pulp was sufficiently washed with ion-exchanged water, dehydrated, and air dried under an atmosphere of 23° C. 0.75 g of the oxidized pulp and 299.25 g of ion-exchanged water were mixed and stirred for 10 minutes in a mixer (IFM-650D, Iwatani Corporation) for pulverizing fibers (a time of the pulverizing treatment was 10 minutes) to provide a suspension. The solid content of the oxidized pulp in the resultant material for gas barrier was 0.25% by mass.

[Preparation of Molded Article Having Gas Barrier Properties]

The material for gas barrier prepared as above (carboxyl group content: 0.92 mmol/g, oxidized pulp content: 0.25% by mass) was cast as it was on a plastic Petri dish without a substrate sheet, dried at 23° C., and then peeled to provide a molded article having gas barrier properties (cast method). The film thickness after being dried was 9 μm. The molded article was measured for properties shown in Table 1.

[Preparation of Molded Composite Having Gas Barrier Properties]

Example 2

A material for gas barrier was similarly prepared as in Example 1. The material for gas barrier was applied on a side of a poly(ethylene terephthalate) (PET) sheet (trade name: Lumirror, Toray Industries Inc., sheet thickness: 7 μm) as a substrate sheet with a bar coater (#50), dried for 120 minutes at 23° C. to provide a molded composite having gas barrier properties. The molded composite was measured for properties shown in Table 1.

Example 3

A material for gas barrier was similarly prepared as in Example 1. The material for gas barrier was applied on a side of a polylactic acid (PLA) sheet (subjected to a corona discharge treatment, sheet thickness: 25 μm, trade name: PG Palgreen LC-4, Tohcello Co., Ltd.) with a bar coater (#50), dried for 120 minutes at 23° C. to provide a molded composite having gas barrier properties. In application, since the polylactic acid sheet exhibited water repellent effects even though the sheet was previously subjected to a corona discharge treatment, the material for gas barrier was mixed with 30% by mass of isopropyl alcohol and applied to the sheet. The molded composite was measured for properties shown in Table 1.

Comparative Example 1

A PET sheet (without a material for gas barrier, sheet thickness: 7 μm) used as the substrate sheet in Example 2 was measured for properties shown in Table 1.

Comparative Example 2

A polylactic acid sheet (without a material for gas barrier, subjected to a corona discharge treatment, sheet thickness: 25 μm) used as the substrate sheet in Example 3 was measured for properties shown in Table 1

TABLE 1

| | | Example | | | Comparative example | |
|---|---|---|---|---|---|---|
| | | 1 | 2 | 3 | 1 | 2 |
| Condition of production | Oxidation condition (temperature/time) | 20° C./60 minutes | 20° C./60 minutes | 20° C./60 minutes | — | — |
| | Pulverization time (minute) | 10 | 10 | 10 | — | — |
| Dispersion (suspension) | Light transmittance (%) | 29.24 | 29.24 | 29.24 | — | — |
| | Viscosity (mPa·s) | 2816 | 2816 | 2816 | — | — |
| | Presence of particle having diameter of not less than 1 μm | None | None | None | — | — |
| Cellulose fiber | Average fiber diameter (nm) | 4.12 | 4.12 | 4.12 | — | — |
| | Average fiber length (nm) | 614 | 614 | 614 | — | — |
| | Average aspect ratio | 149 | 149 | 149 | — | — |
| | Content of carboxyl group (mmol/g) | 0.92 | 0.92 | 0.92 | — | — |
| | Content of fine cellulose fibers (%) | 31.0 | 31.0 | 31.0 | — | — |
| Molded composite having gas barrier properties and substrate sheet | Kind of base sheet | — | PET | PLA | PET | PLA |
| | Thickness of base sheet (μm) | — | 7 | 25 | 7 | 25 |
| | Thickness of gas baria (nm) | 9000 | 80 | 60 | — | — |
| | oxygen permeability (differential pressure method) (cm$^3$/m$^2$·day·Pa) | 15 | 11 | 19 | 289 | 746 |
| | Vapor permeability (g/m$^2$·day) | — | — | 276 | 90 | 335 |

In Table 1, each thickness of gas barrier layers of Examples 2 and 3 was calculated from the thickness of the wet film and the solid content assuming that the specific gravity of cellulose was 1.5. The value agreed with the film thickness measured with an atomic force microscope. From the comparison of Examples 1 to 3 to Comparative Examples 1 and 2, it is confirmed that the molded article of Example 1 had significantly increased gas barrier properties. It is also confirmed that the molded composites of Examples 2 and 3 had significantly increased gas barrier properties (oxygen barrier properties and vapor barrier properties) even though these had thin gas barrier layers. A thin gas barrier layer enables production of a molded composite having gas barrier properties with good economic efficiency. Example 3 is the molded composite having gas barrier properties in which both the substrate sheet and the gas barrier layer are biodegradable.

Examples 4 to 5

100 g of the bleached softwood kraft pulp was sufficiently stirred in 9900 g of ion-exchanged water. In relation to 100 g by mass of the pulp, 0.31% by mass of TEMPO, 12.5% by mass of sodium bromide and 14.2% by mass of sodium hypochlorite were added in this order. The pulp was oxidized for a predetermined time for Examples shown in Table 2 while keeping the pH at 10.5 by dropping 0.5M sodium hydroxide using a pH-stat.

Then, dropping was stopped to provide an oxidized pulp. The oxidized pulp was sufficiently washed with ion-exchanged water and dehydrated. 100 g of the oxidized pulp and 9900 g of ion-exchanged water were mixed and stirred for a predetermined time shown in Table 2 in a mixer (Vita-Mix-Blender ABSOLUTE, Osaka Chemical Co., Ltd.) for pulverizing fibers to provide a suspension. The solid content of the oxidized pulp in the resultant material for gas barrier was 1.0% by mass.

Then, the material for gas barrier (oxidized pulp content: 1.0% by mass) was applied on a side of a poly(ethylene terephthalate) (PET) sheet (trade name: Lumirror, Toray Industries Inc., sheet thickness: 7 μm) as a substrate sheet with a bar coater (#50), dried for 6 hours at 23° C. to provide a molded composite having gas barrier properties. The molded composite was measured for properties shown in Table 2. For Example 5, an optical microscopic image (FIG. 1) and an optical microscopic image (crossed nicols) (FIG. 2) of the suspension after the pulverizing treatment are shown.

Examples 6 to 8

Figure 3:
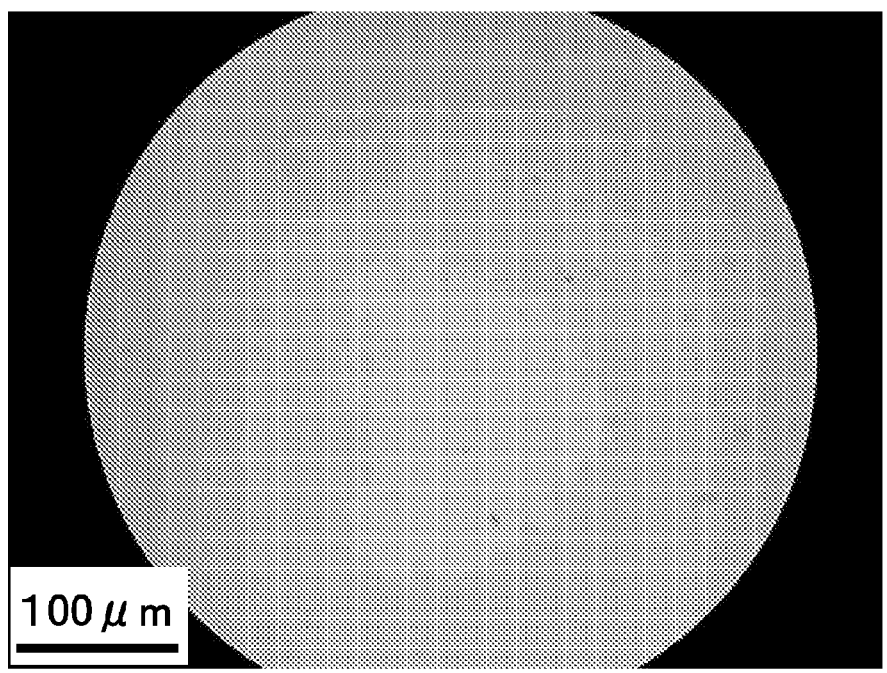
FIG. 3 shows an optical microscopic image of the suspension in Example 7.
Figure 4:
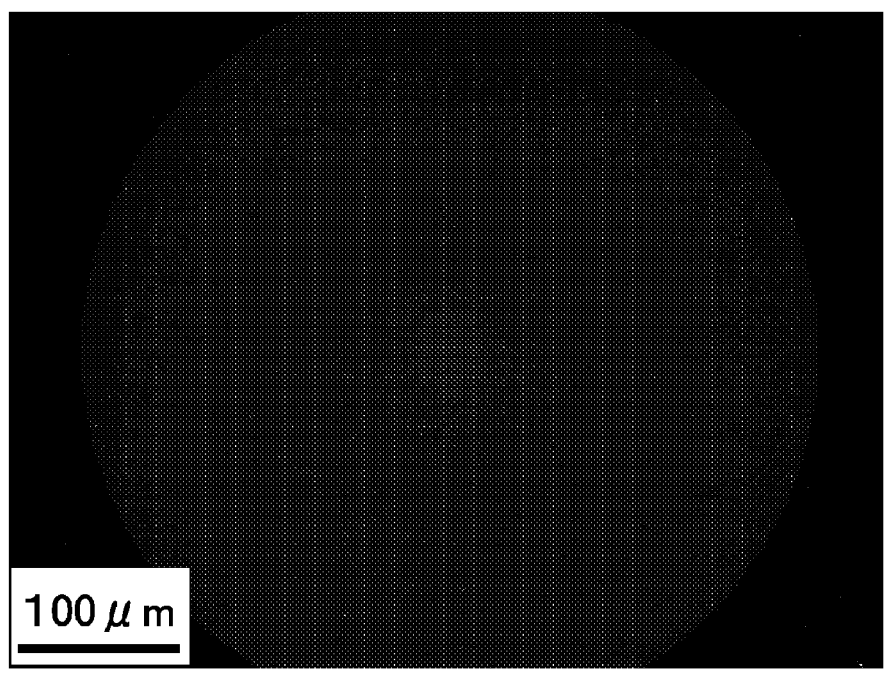
FIG. 4 shows an optical microscopic image under crossed nicols of the suspension in Example 7.

Materials for gas barrier were similarly prepared as in Example 4, except that 1.25% by mass of TEMPO and 28.4% by mass of sodium hypochlorite were used (conditions are shown in Table 2). Then, molded composites having gas barrier properties were similarly prepared as in Example 4, and measured for properties shown in Table 2. For Example 7, an optical microscopic image (FIG. 3) and an optical microscopic image (crossed nicols) (FIG. 4) of the suspension are shown.

Examples 9 to 10

Materials for gas barrier were similarly prepared as in Example 4, except that 1.25% by mass of TEMPO and 56.8% by mass of sodium hypochlorite were used (conditions are shown in Table 2). Then, molded composites having gas barrier properties were similarly prepared as in Example 4, and measured for properties shown in Table 2.

Example 11

A material for gas barrier was prepared in the same way as Example 4, except that 1.25% by mass of TEMPO and 56.8% by mass of sodium hypochlorite were used in place of microcrystalline cellulose (MCC) (KC-Flock 300G, manufactured by Nippon Paper Chemicals Co., Ltd.), (conditions are shown in Table 2). Then, a molded composite having gas barrier properties was similarly prepared as in Example 4, and measured for properties shown in Table 2.

Example 12

1 g of bacterial cellulose was sufficiently stirred for 10 minutes in 299 g of ion-exchanged water with a mixer (Vita-Mix-Blender ABSOLUTE, OSAKA CHEMICAL Co., Ltd.). In relation to 1 g by mass of the bacterial cellulose, 1.25% by mass of TEMPO, 12.5% by mass of sodium bromide and 28.4% by mass of sodium hypochlorite were added in this order. The bacterial cellulose was oxidized for 240 minutes while keeping the pH at 10.5 by dropping 0.5M sodium hydroxide using a pH-stat.

Then, dropping was stopped to provide an oxidized bacterial cellulose. The oxidized bacterial cellulose was sufficiently washed with ion-exchanged water and dehydrated. 1 g of the oxidized bacterial cellulose and 199 g of ion-exchanged water were mixed and stirred for 10 minutes in a mixer (Nippon Seiki Co., Ltd., ED-4Z58K-213) for pulverizing the oxidized bacterial cellulose to produce a suspension. The solid content of the oxidized bacterial cellulose in the resultant material for gas barrier was 0.5% by mass. Then, a molded composite having gas barrier properties was similarly prepared as in Example 4 (except that a bar coater (#100) was used), and measured for properties shown in Table 2.

Example 13

1 g of bacterial cellulose was sufficiently stirred for 10 minutes in 299 g of ion-exchanged water with a mixer (ED-4, Nippon Seiki Co., Ltd.). In relation to 1 g by mass of the bacterial cellulose, 1.25% by mass of TEMPO, 12.5% by mass of sodium bromide and 28.4% by mass of sodium hypochlorite were added in this order. The bacterial cellulose was oxidized for 60 minutes while keeping the pH at 10.5 by dropping 0.5M sodium hydroxide using a pH-stat.

Then, dropping was stopped to provide an oxidized bacterial cellulose. The oxidized bacterial cellulose was sufficiently washed with ion-exchanged water and dehydrated. 1 g of the oxidized bacterial cellulose and 99 g of ion-exchanged water were mixed and stirred for 5 minutes in a mixer (ED-4, Nippon Seiki Co., Ltd.) for pulverizing the oxidized bacterial cellulose to provide a suspension. The solid content of the oxidized bacterial cellulose in the resultant material for gas barrier was 1.0% by mass. Then, a molded composite having gas barrier properties was similarly prepared as in Example 4 and measured for properties shown in Table 2.

Examples 14 to 18

A material for gas barrier similarly prepared as in Example 7 was applied on substrate sheets shown in Table 2 and dried in the same way as Example 4 to provide molded composites having gas barrier properties. In Examples 15 to 18, suspensions of the material were mixed with isopropyl alcohol in an amount of 30% by mass and applied to sheets.

In Table 2, substrate sheets used were the following commercial products: triacetate cellulose (TAC) sheet (trade name: Ronza TAC, Panac Corporation, sheet thickness: 50 µm), polylaminate paper (laminate sheet of polyolefin and pulp sheets, sheet thickness: 500 µm), poly(ethylene terephthalate) (PET) sheet (trade name: GE, Teijin Limited, sheet thickness: 25 µm), polylactic acid (PLA) sheet (subjected to a corona discharge treatment, trade name: PG Palgreen LC-4, Tohcello Co., Ltd., sheet thickness: 25 µm), and a sheet having a thickness of 50 µm and prepared by pasting two sheets of the PLA sheet with an acrylic rubber adhesive.

TABLE 2

|  |  | Example | | | | | | | |
|---|---|---|---|---|---|---|---|---|---|
|  |  | 4 | 5 | 6 | 7 | 8 | 9 | 10 | 11 |
| Condition of production | Oxidation time | 10 minutes | 10 minutes | 120 minutes | 120 minutes | 120 minutes | 240 minutes | 240 minutes | 120 minutes |
|  | Pulverization time (minute) | 10 | 60 | 10 | 120 | 300 | 10 | 120 | 10 |
| Dispersion (suspension) | Light transmittance (%)[X·1] | 0.5 | 1.2 | 95.5 | 97.1 | 95.8 | 97 | 97.1 | 66.4 |
|  | Viscosity (mPa·s)[X·1] | 768 | 1075 | 3226 | 563 | 154 | 614 | 154 | 307 |
|  | Presence of particle having diameter of not less than 1 µm | None | None | None | None | None | None | None | None |
| Cellulose fiber | Average fiber diameter (nm) | 7.26 | 7.09 | 3.25 | 3.13 | 3.63 | 3.62 | 3.8 | 3.76 |
|  | Average fiber length (µm) | 2.1 | 2.01 | 0.99 | 0.74 | 0.68 | 0.85 | 0.75 | 0.85 |
|  | Average aspect ratio | 290 | 330 | 305 | 238 | 188 | 235 | 198 | 225 |
|  | Content of carboxyl group (mmol/g) | 0.59 | 0.59 | 1.23 | 1.23 | 1.23 | 1.36 | 1.36 | 1.23 |
|  | Content of fine cellulose fibers (%) | 13.6 | 22.7 | 100 | 90.9 | 100 | 100 | 100 | 100 |
| Molded composite having gas barrier properties | Kind of substrate sheet | PET | PET | PET | PET | PET | PET | PET | PET |
|  | Thickness of substrate sheet (µm) | 7 | 7 | 7 | 7 | 7 | 7 | 7 | 7 |
|  | Thickness of gas barrier layer (nm) | 400 | 400 | 400 | 400 | 400 | 400 | 400 | 400 |
|  | oxygen permeability (differential pressure method) (cm³/m²·day·hPa) | 1.39 | 1.49 | 1.37 | 1.23 | 1.20 | 1.01 | 1.09 | 1.37 |
|  | Oxygen permeability (equal pressure method) (cm³/m²·day·hPa) | 12.946 | 0.102 | 0.091 | 0.068 | 0.064 | 0.066 | 0.053 | 0.07 |
|  | Vapor permeability (g/m²·day) | 79.9 | 80.8 | 84.5 | 81.5 | 82.6 | 81.4 | 83.3 | 80.8 |

|  |  | Example | | | | | | |
|---|---|---|---|---|---|---|---|---|
|  |  | 12 | 13 | 14 | 15 | 16 | 17 | 18 |
| Condition of production | Oxidation time | 240 minutes | 60 minutes | 120 minutes | 120 minutes | 120 minutes | 120 minutes | 120 minutes |
|  | Pulverization time (minute) | 10 | 5 | 120 | 120 | 120 | 120 | 120 |
| Dispersion (suspension) | Light transmittance (%)[X·1] | 78.8 | 37.9 | 97.1 | 97.1 | 97.1 | 97.1 | 97.1 |
|  | Viscosity (mPa·s)[X·1] | 205 | 1024 | 563 | 563 | 563 | 563 | 563 |
|  | Presence of particle having diameter of not less than 1 µm | None | None | None | None | None | None | None |
| Cellulose fiber | Average fiber diameter (nm) | 4.63 | 5.66 | 3.13 | 3.13 | 3.13 | 3.13 | 3.13 |
|  | Average fiber length (µm) | 1.01 | 2.12 | 0.74 | 0.74 | 0.74 | 0.74 | 0.74 |
|  | Average aspect ratio | 218 | 375 | 238 | 238 | 238 | 238 | 238 |
|  | Content of carboxyl group (mmol/g) | 1.02 | 0.99 | 1.23 | 1.23 | 1.23 | 1.23 | 1.23 |
|  | Content of fine cellulose fibers (%) | 57.4 | — | 90.9 | 90.9 | 90.9 | 90.9 | 90.9 |
| Molded composite having gas barrier properties | Kind of substrate sheet | PET | PET | PET | PLA | PLA | TAC | polylaminate paper |
|  | Thickness of substrate sheet (µm) | 7 | 7 | 25 | 25 | 50 | 50 | 500 |
|  | Thickness of gas barrier layer (nm) | 400 | 400 | 400 | 300 | 300 | 300 | 300 |
|  | oxygen permeability (differential pressure method) (cm³/m²·day·hPa) | 1.29 | 1.29 | 1.28 | 1.61 | 1.73 | 1.06 | 5.12 |
|  | Oxygen permeability (equal pressure method) (cm³/m²·day·hPa) | 0.065 | 0.160 | 0.113 | 0.164 | 0.109 | 0.118 | 0.447 |
|  | Vapor permeability (g/m²·day) | 80.9 | 84.8 | 24.6 | 303.2 | 157 | 859.6 | 7.3 |

[X·1] determined in Example 12 at 0.5% concentration for light transmittance and viscosity As shown in Table 2, a molded composite having oxygen barrier properties according to the specifications can be produced by controlling the amount of the carboxyl group and the aspect ratio.

Examples 4 to 10 were performed for comparing various oxidizing conditions and pulverizing conditions using the softwood kraft pulp as a starting material. It is shown that high oxygen barrier properties can be achieved by adjusting an amount of the carboxyl group and the aspect ratio. Examples 6 to 10 containing carboxyl groups in an amount of 0.6 to 1.6 mmol/g showed particularly high oxygen barrier properties. Comparing Examples 6 to 8 containing carboxyl groups in the same amount, it is shown that the smaller aspect ratio results in the higher oxygen barrier properties.

In Examples 6 to 10, suspensions of materials for gas barrier had 90% or higher light transmittance, and molded composites having gas barrier properties had high oxygen barrier properties and were highly transparent. In Examples 4 to 10, the content of fine cellulose fibers was not less than 5%. Particularly in Examples 6 to 10, the content of fine cellulose fibers was not less than 90% and higher oxygen barrier properties were achieved. In these Examples, the vapor permeability was about 10 g/m²·day lower than Comparative Example 1, which meant improved vapor barrier properties.

Figure 2:
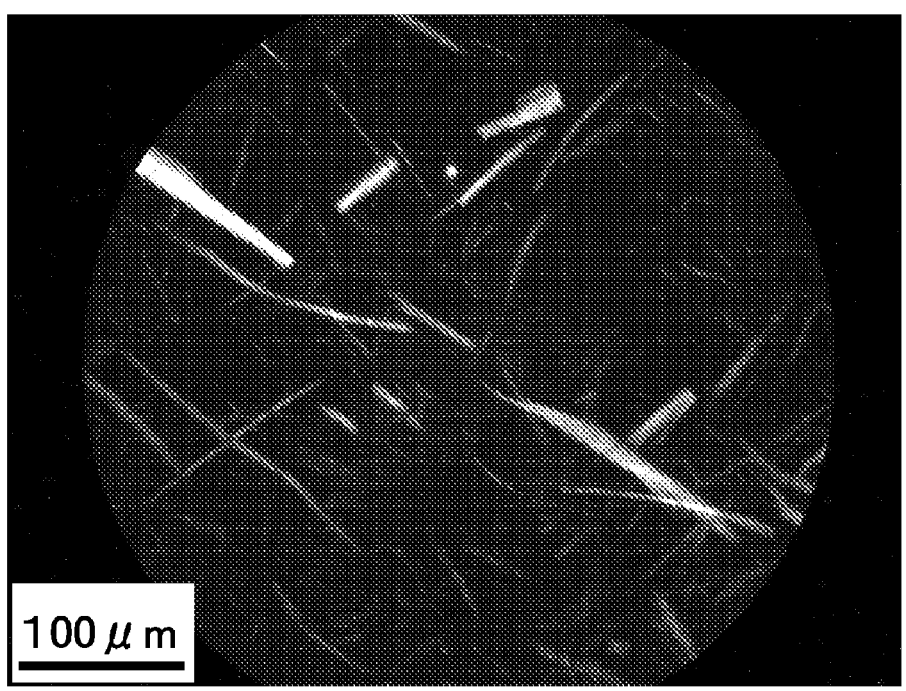
FIG. 2 shows an optical microscopic image under crossed nicols of the suspension in Example 5.

Optical microscopic images of suspensions of Examples 5 and 7 are shown in FIGS. 1, 2, 3, and 4. In FIGS. 1 and 2 (Example 5), cellulose fibers are recognized, but in FIGS. 3 and 4 (Example 7) cellulose fibers are not recognized because almost all the fibers of the suspension have been pulverized. These results are consistent with the tendency of the content of fine cellulose fibers. As shown in FIGS. 1, 2, 3, and 4, a cellulose particle having a particle diameter of not less than 1 μm could not be seen.

Example 11 used a microcrystalline cellulose as a starting material, prepared a suspension by TEMPO oxidation and the pulverizing treatment, and produced a molded composite having gas barrier properties from the suspension. Comparing with Comparative Example 7 (without the pulverizing step of Example 11) described below, the molded composite had good oxygen barrier properties. This suggests that fine cellulose fibers produced by the pulverizing treatment and not produced in Comparative Example 7 formed a more compact gas barrier layer to provide high gas barrier properties.

Examples 12 and 13 used a bacterial cellulose, prepared suspensions by TEMPO oxidation and the pulverizing treatment of the cellulose, and produced molded composites having gas barrier properties from the suspensions. Comparing with Comparative Example 5 (without the oxidizing and pulverizing steps of the bacterial cellulose) described below, introduction of the carboxyl group increased light transmittance of the suspension and significantly improved oxygen barrier properties.

Examples 14 to 18 were carried out for comparing vapor permeabilities of molded composites having gas barrier properties produced with substrate sheets having different vapor permeabilities. As clearly shown in Table 2, a molded composite having gas barrier properties produced with a substrate having a low vapor permeability had a low vapor permeability. For example, a vapor permeability of polylaminate paper used in Example 18 is 12 g/m²·day. Example 18 showed that the vapor permeability was decreased even to 7.3 g/m²·day by coating the substrate paper with the material for gas barrier at a thickness of only 300 nm. From these results, it is suggested that prevention of vapor dissolution and dispersion in a layer composed of the material for gas barrier kept a high cohesion force of fine cellulose fibers due to hydrogen bonding among fine cellulose fibers to exhibit high vapor barrier properties.

These results are very consistent with results of oxygen barrier properties under low humidity conditions.

Comparative Example 3

1 g of the bleached softwood kraft pulp was mixed with 99 g of ion-exchanged water to prepare a 1.0% by mass suspension. A molded composite was similarly prepared by the applying and drying steps of Example 4, and measured for properties shown in Table 3.

Comparative Example 4

1 g of microfibril cellulose (Daicel Chemical Industries, Ltd.) was mixed with 99 g of ion-exchanged water to prepare a 1.0% by mass suspension. A molded composite was similarly prepared by the applying and drying steps of Example 4, and measured for properties shown in Table 3.

Comparative Example 5

1 g of bacterial cellulose was mixed with 99 g of ion-exchanged water to prepare a 1.0% by mass suspension. A molded composite was similarly prepared by the applying and drying steps of Example 4, and measured for properties shown in Table 3.

Comparative Example 6

10 g of low crystalline cellulose was sufficiently stirred in 990 g of ion-exchanged water. 1.25% by mass of TEMPO, 12.5% by mass of sodium bromide and 42.9% by mass of sodium hypochlorite were added in this order. The low crystalline cellulose was oxidized while keeping the pH at 10.5 and the temperature at 20° C. by dropping 0.5M sodium hydroxide using a pH-stat. The oxidization was continued until solid matters were completely dissolved. Then, dropping was stopped, and the resultant aqueous solution was poured into ethanol. A precipitate was collected and air dried to provide polyuronic acid. 2 g of the prepared polyuronic acid was dissolved in 98 g of ion-exchanged water. Isopropyl alcohol was then added in an amount of 30% by mass. A molded composite was similarly prepared by the applying and drying steps of Example 4, and measured for properties shown in Table 3.

Comparative Example 7

Figure 5:
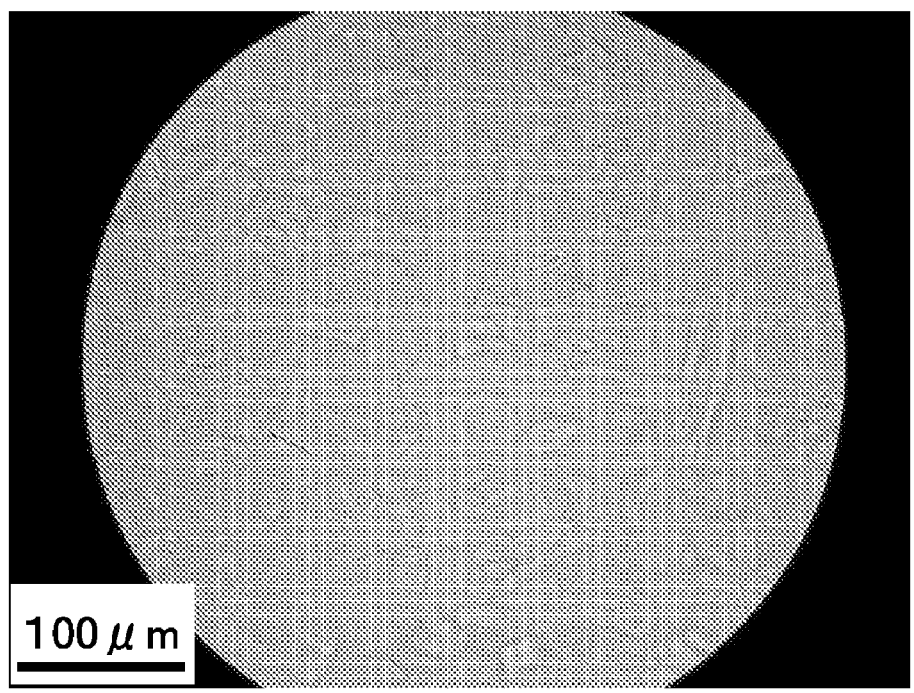
FIG. 5 shows an optical microscopic image of the suspension in Comparative Example 7.
Figure 6:
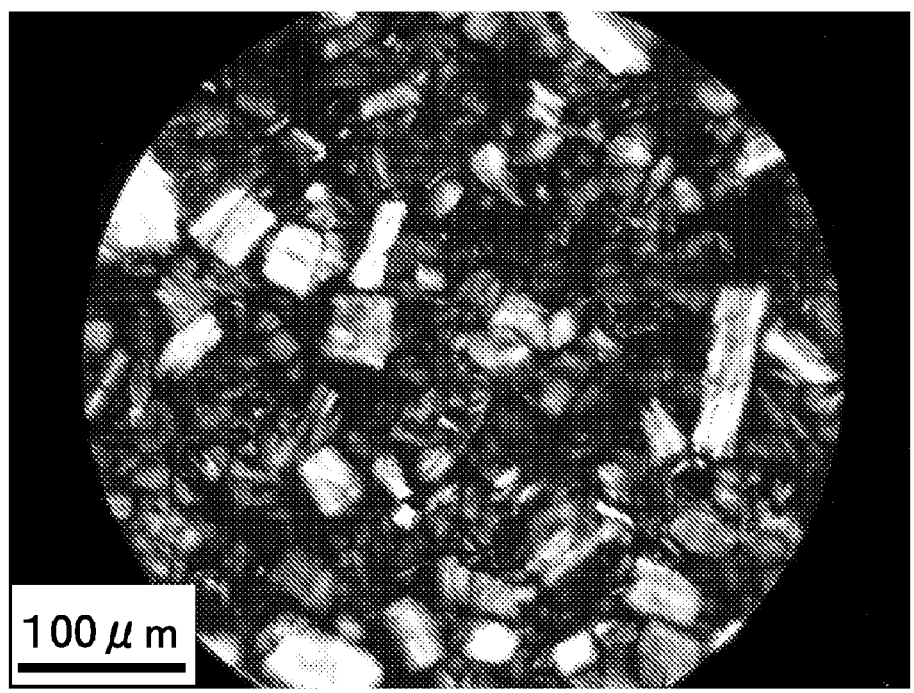
FIG. 6 shows an optical microscopic image under crossed nicols of the suspension in Comparative Example 7.

A suspension of 3.0% by mass MCC was similarly prepared as in Example 7, except that the pulverizing treatment was not performed. Isopropyl alcohol in an amount of 30% by mass was then added. A molded composite was similarly prepared by the application and drying steps of Example 4, and measured for properties shown in Table 3. For Comparative Example 7, an optical microscopic image (FIG. 5) and an optical microscopic image under crossed nicols (FIG. 6) of the suspension are shown.

Comparative Example 8

10 g of rayon fibers (56 dtex×5 mm, Daiwabo Co., Ltd.) was sufficiently stirred in 990 g of ion-exchanged water. 1.25% by mass of TEMPO, 12.5% by mass of sodium bromide and 42.9% by mass of sodium hypochlorite were then added in this order. The rayon fibers were oxidized while keeping the pH at 10.5 and the temperature at 20° C. by dropping 0.5M sodium hydroxide using a pH-stat.

Dropping was continued until solid matters were completely dissolved. Then, dropping was stopped, and the resultant aqueous solution was poured into ethanol. A precipitate was collected and air dried to provide polyuronic acid. 4 g of the prepared polyuronic acid was dissolved in 96 g of ion-exchanged water. Isopropyl alcohol was then added in an amount of 30% by mass. A molded composite was similarly prepared by the application and drying steps of Example 4, and measured for properties shown in Table 3.

Comparative Examples 9 to 13

Substrate sheets used in Examples 14 to 18 were measured for properties shown in Table 3.

In Comparative Examples 3, 4, and 5, celluloses contained carboxyl groups in an amount of not more than 0.1 mmol/g and were insufficiently dispersed. Suspensions thus could not be applied uniformly with a bar coater, and molded composites having gas barrier properties could not be produced. In Comparative Examples 6 to 8, suspensions could be applied uniformly by thickly coating, but resultant composites did not exhibit similar oxygen barrier properties to that of Examples 4 to 18.

In Comparative Example 7, optical microscopic images of the suspension (FIGS. 5 and 6) showed that the suspension contained cellulose particles having a particle diameter of not less than 1 μm. The suspension also had a content of fine

TABLE 3

| | | Comparative example | | | | |
|---|---|---|---|---|---|---|
| | | 3 | 4 | 5 | 6 | 7 |
| Content of carboxyl group (mmol/g) | | 0.07 | 0.05 | 0.09 | 2.54 | 1.23 |
| Average fiber diameter (nm)[X.1] | | Not measured | Not measured | 36.84 | Not measured | 17000 |
| Average fiber length (μm)[X.1] | | Not measured | Not measured | 11.8 | Not measured | 35.7 |
| Average aspect ratio[X.1] | | Not measured | Not measured | 320 | Not measured | 2.1 |
| Presence of particle having diameter of not less than 1 μm | | None | None | None | None | present |
| Light transmittance (%)[X.2] | | 1 | 0.1 | 0.5 | 75.2 | 0.3 |
| Content of fine cellulose fibers (%) | | 0 | 0 | 0 | — | 0 |
| Molded composite and substrate sheet | Kind of substrate sheet | PET | PET | PET | PET | PET |
| | Thickness of substrate sheet (μm) | 7 | 7 | 7 | 7 | 7 |
| | Thickness of gas barrier layer (nm) | — | — | — | 600 | 900 |
| | Oxygen permeability (differential pressure method) (cm³/m²·day·Pa) | could not be applied | could not be applied | could not be applied | 44.2 | 7.6 |
| | Oxygen permeability (equal pressure method) (cm³/m²·day·Pa) | could not be applied | could not be applied | could not be applied | 74.2 | 22.8 |
| | Vapor permeability (g/m²·day) | could not be applied | could not be applied | could not be applied | 75.3 | 76.1 |

| | | Comparative example | | | | |
|---|---|---|---|---|---|---|
| | | 8 | 9 | 10 | 11 | 12 |
| Content of carboxyl group (mmol/g) | | 3.47 | — | — | — | — |
| Average fiber diameter (nm)[X.1] | | Not measured | — | — | — | — |
| Average fiber length (μm)[X.1] | | Not measured | — | — | — | — |
| Average aspect ratio[X.1] | | Not measured | — | — | — | — |
| Presence of particle having diameter of not less than 1 μm | | None | — | — | — | — |
| Light transmittance (%)[X.2] | | 92.6 | — | — | — | — |
| Content of fine cellulose fibers (%) | | — | — | — | — | — |
| Molded composite and substrate sheet | Kind of substrate sheet | PET | PET | PLA | TAC | polylaminate sheet |
| | Thickness of substrate sheet (μm) | 7 | 25 | 50 | 50 | 500 |
| | Thickness of gas barrier layer (nm) | 1200 | — | — | — | — |
| | Oxygen permeability (differential pressure method) (cm³/m²·day·Pa) | 18.6 | 57.8 | 339 | Not measured | Not measured |
| | Oxygen permeability (equal pressure method) (cm³/m²·day·Pa) | 25.7 | 60.8 | Not measured | Not measured | Not measured |
| | Vapor permeability (g/m²·day) | 88.7 | 25.2 | 174.9 | 960.8 | 12.3 |

[X.1]In Comparative Example 5, the fiber length and the aspect ratio were measured using an atomic force microscopic image. In Comparative Example 7, the fiber diameter, the fiber length, and the aspect ratio were measured using an optical microscopic image.
[X.2]Concentrations of suspensions used for measuring light transmittance were 4% for Comparative Example 6, 3% for Comparative Example 7, and 4% for Comparative Example 8.

cellulose fibers of 0%, and could not provide high oxygen barrier properties as Example 11.

Examples 19 to 27

(1) Starting Material, Catalyst, Oxidant, Cooxidant

The same materials and agents as those in Example 1 were used.

(2) Procedure of Production

A material for gas barrier was similarly prepared as in Example 7, except that a dispersing treatment after oxidization was performed with a high-pressure homogenizer.

Then, the material for gas barrier (oxidized pulp amount: 1.0% by mass) was applied on a side of a poly(ethylene terephthalate) sheet (trade name: GE, Teijin Limited, sheet thickness: 25 μm) as a substrate sheet to provide a molded composite having a gas barrier layer of 150 nm thickness (Example 19). On the molded composites thus prepared, moisture preventive layers shown in Table 4 were pasted with an acrylic rubber adhesive at the side of the material for gas barrier coated to provide molded composites having gas barrier properties (Examples 20 to 27). These molded composites were measured for properties shown in Table 4. An oxygen permeability of the molded composite was measured under conditions that a layer of the material for gas barrier or a moisture preventive layer was in an oxygen gas atmosphere of 23° C., 90% RH and a side of the substrate sheet was in a nitrogen gas (carrier gas) atmosphere of 23° C., 0% RH.

Moisture preventive layers shown in Table 4 used were the following commercial products: poly(ethylene terephthalate) (PET) sheet (trade name: GE, Teijin Limited, sheet thickness: 7 μm), poly(ethylene terephthalate) (PET) sheet (trade name: GE, Teijin Limited, sheet thickness: 25 μm), polylactic acid (PLA) sheet (subjected to a corona discharge treatment, trade name: PG Palgreen LC-4, Tohcello Co., Ltd., sheet thickness: 25 μm), nylon (NY) sheet (trade name: SNR15, Mitsubishi Plastics, Inc., sheet thickness: 15 μm), nylon (NY) sheet (trade name: SNR25, Mitsubishi Plastics, Inc., sheet thickness: 25 μm), biaxially oriented polypropylene (OPP) sheet (trade name: OP U-1#20, Tohcello Co., Ltd., sheet thickness: 20 μm), biaxially oriented polypropylene (OPP) sheet (trade name: OP U-1#50, Tohcello Co., Ltd., sheet thickness: 50 μm), and cast polypropylene (CPP) sheet (trade name: SC#50, Tohcello Co., Ltd., sheet thickness: 50 μm).

As shown in Table 4, in Examples 20 to 27, a molded composite containing a moisture preventive layer having the higher vapor barrier properties kept a more high oxygen barrier properties of the material for gas barrier and exhibited a lower oxygen permeability under high humidity conditions. A molded composite particularly containing a moisture preventive layer having a vapor permeability of not more than 100 $cm^3/m^2 \cdot day \cdot Pa$ can suppress reduction of oxygen barrier properties under high humidity conditions. It is considered because a moisture proof film prevents water adsorption on the layer of the material for gas barrier to keep oxygen barrier properties. The total gas barrier properties of a molded composite under high humidity conditions can be controlled by selecting a moisture proof film.

The invention claimed is:

1. A material for gas barrier, comprising cellulose fibers having an average fiber diameter of not more than 200 nm and the cellulose fibers having an average aspect ratio from 10 to 1,000, wherein the content of carboxyl group in a cellulose composing the cellulose fiber ranges from 0.1 to 2 mmol/g, and wherein a suspension of the cellulose fibers diluted to 1% by mass of a solid content has a light transmittance of not less than 0.5%.

2. The material for gas barrier according to claim 1, wherein a suspension of the cellulose fibers diluted to 0.1% by mass of a solid content contains cellulose fibers passing through a 16 μm-mesh glass filter in an amount of not less than 5% by mass of the whole cellulose fibers in the suspension before passing.

3. The material for gas barrier according to claim 1, wherein a suspension of the cellulose fibers diluted to 1% by mass of a solid content does not contain a cellulose particle having a particle diameter of not less than 1 μm.

4. A molded article having gas barrier properties, comprising the material for gas barrier according to claim 1.

5. A molded composite having gas barrier properties, comprising a molded substrate and a layer comprising the material for gas barrier according to claim 1.

6. The molded composite having gas barrier properties according to claim 5, wherein the molded composite optionally comprises a moisture preventive layer covering the substrate, and wherein the substrate or the moisture preventive layer has a vapor permeability from 0.1 to 600 $g/m^2 \cdot day$.

TABLE 4

| | | Example | | | | | | | | |
|---|---|---|---|---|---|---|---|---|---|---|
| | | 19 | 20 | 21 | 22 | 23 | 24 | 25 | 26 | 27 |
| Content of carboxyl group (mmol/g) | | 1.21 | 1.21 | 1.21 | 1.21 | 1.21 | 1.21 | 1.21 | 1.21 | 1.21 |
| Average fiber diameter (nm) | | 3.92 | 3.92 | 3.92 | 3.92 | 3.92 | 3.92 | 3.92 | 3.92 | 3.92 |
| Average fiber length (μm) | | 0.49 | 0.49 | 0.49 | 0.49 | 0.49 | 0.49 | 0.49 | 0.49 | 0.49 |
| Average aspect ratio | | 125 | 125 | 125 | 125 | 125 | 125 | 125 | 125 | 125 |
| Light transmittance (%) | | 94.3 | 94.3 | 94.3 | 94.3 | 94.3 | 94.3 | 94.3 | 94.3 | 94.3 |
| Layer of preventing humidity | Kind | — | NY | PLA | NY | PET | PET | OPP | CPP | OPP |
| | Thickness (μm) | — | 15 | 25 | 25 | 7 | 25 | 20 | 50 | 50 |
| | Vapor permeability ($g/m^2 \cdot day$) | — | 388.0 | 318.7 | 233.0 | 92.0 | 24.4 | 7.7 | 6.9 | 2.7 |
| Molded composite having gas barrier properties | Oxygen permeability at 90% RH (equal pressure method) ($cm^3/m^2 \cdot day \cdot Pa$) | 47.4 | 25.9 | 18.8 | 18.9 | 14.5 | 10.8 | 6.9 | 4.3 | 1.6 |

7. The molded composite having gas barrier properties according to claim 5 or 6, wherein the substrate or the moisture preventive layer is composed of a biodegradable material or a biomass-derived material.

8. The molded composite having gas barrier properties according to claim 5, wherein the layer composed of the material for gas barrier has a thickness of not more than 900 nm.

9. The molded composite having gas barrier properties according to claim 5, wherein the layer composed of the material for gas barrier is formed by coating or spraying the material for gas barrier.

* * * * *